INVENTOR.
DONALD R. BOERNER
BY Karl A. Ohralik
ATTORNEY

United States Patent Office 3,515,828
Patented June 2, 1970

3,515,828
FLUIDIC TO ELECTRONIC CONVERTER
Donald R. Boerner, Wayne, N.J., assignor to Singer-General Precision, Inc., a corporation of Delaware
Filed Mar. 1, 1968, Ser. No. 709,572
Int. Cl. H01h 35/40
U.S. Cl. 200—83                                                 2 Claims

ABSTRACT OF THE DISCLOSURE

A fluidic to electronic converter switch responsive to pressure signals as from a fluidic flip-flop amplifier, to produce corresponding electronical signals. A pair of chambers separated by a resilient diaphragm are formed by a simple, compact arrangement of sandwiched components including circuit boards, the diaphragh and an insulator board, wherein the circuit boards and the insulator board have holes to form the chambers. Fluidic communication between the chambers and exterior apparatus is facilitated by channels through the sandwiched arrangement. Electrical contacts are disposed on each side of the diaphragm and are supported in spaced relationship with respect to it in its undeflected condition. In response to pressure differentials of sufficient magnitude across the diaphragm, it deflects to establish electrical contact between the diaphragm and one of the contacts.

---

The invention herein described was made in the course of or under a contract or subcontract thereunder (or grant) with the Department of the Army.

BACKGROUND OF THE INVENTION

This invention relates to a transducer apparatus and more particularly to a switch apparatus which is responsive to fluidic pressure changes to effect electrical switching.

Pressure responsive switches are old and well known; and widespread application of such switches exists in many fields. However, a rapidly developing technology in the field of fluidic controls, especially for space vehicles and missiles, has created a need for pressure responsive switches of unusual qualities and characteristics. More specifically, these uses require small size, light weight, and overall compactness for use in space vehicles and missiles. In accordance with the construction or engineering design of existing pressure responsive switches, a certain amount of reduction in size and weight is possible; however, even with such reductions, there is much room for improvement and much more to be desired.

In accordance with this invention, a pressure responsive switch of novel construction facilitates a reduction of size and weight of several times without limiting the performance and usefulness of the switch. In particular, a switching apparatus is constructed of a sandwiched arrangement of circuit boards, comprising thin insulating members each having a thin conductor secured to it, a spacer board and a resilient, conductive diaphragm together with electrical contacts. The spacer board and a circuit board are apertured and are placed on opposite sides of the diaphragm whereby the diaphragm is free to deflect into these apertures. Two additional circuit boards, one on each side of the arrangement described, hold electrical contacts projecting into these apertures for contact with the diaphragm in its deflected position. The respective conductors on the circuit boards extend between external terminals on the one hand and the diaphragm and the two electrical contacts on the other hand and fluidic communication is established between the chambers formed by the mentioned apertures and the exterior of the apparatus. Accordingly, this novel arrangement of thin circuit boards, spacer, diaphragm and electrical contacts, inherently provides a switch that is unusually compact, light, and small.

Other objects and many additional advantages will be more readily understood by those skilled in the art after a detailed consideration of the following specification taken with the accompanying drawings.

DESCRIPTION OF THE PREFERRED EMBODIMENT

Figure 1:
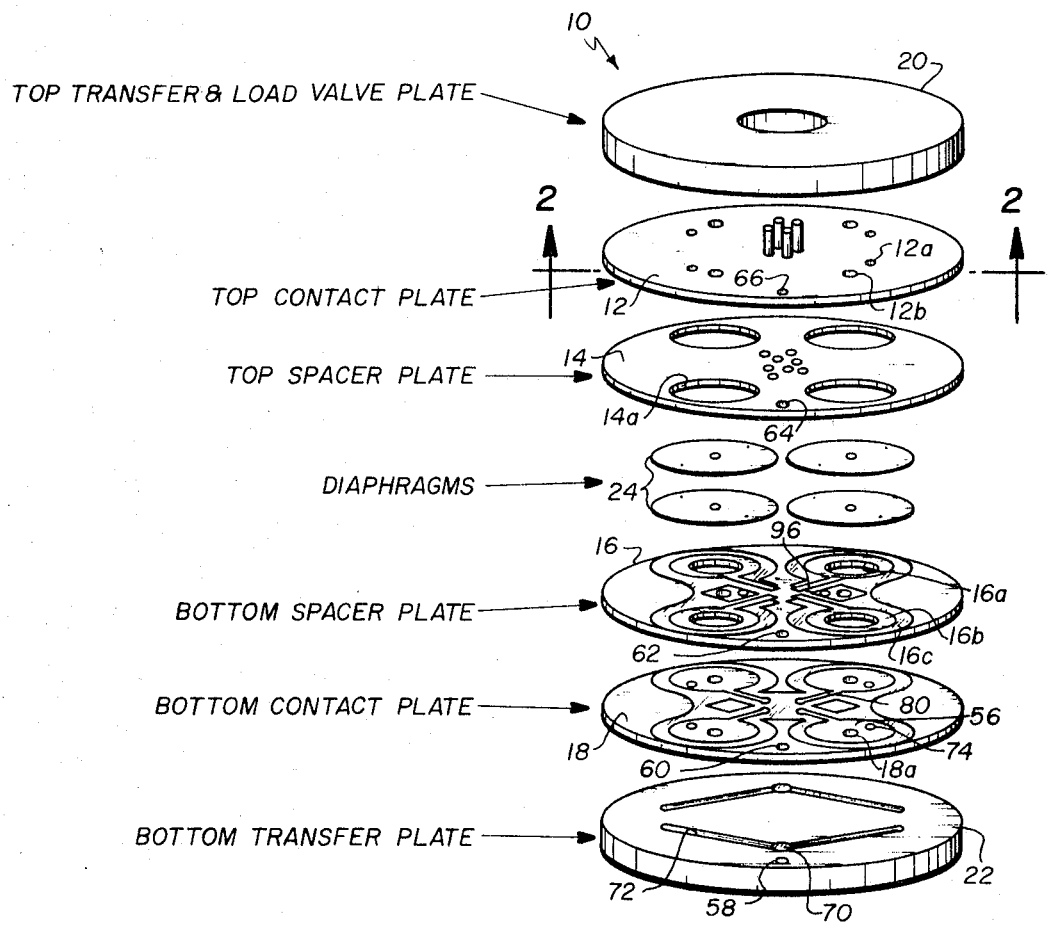
FIG. 1 is an axially exploded view of a switch according to the invention.
Figure 2:
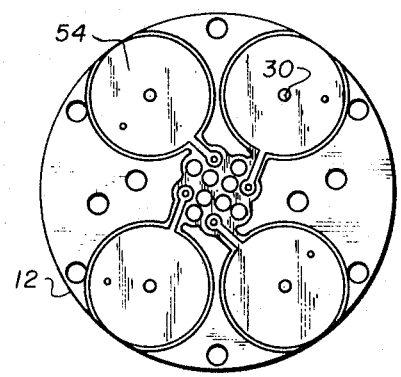
FIG. 2 is a plan view of one of the discs shown in FIG. 1 and taken along section 2—2 of FIG. 1.

Referring now to the drawings for a detailed description of the invention, in FIG. 1, 10 represents, in an exploded view, a switching apparatus incorporating four substantially identical switches, each being constructed in accordance with this invention. The apparatus 10 has four discs 12, 14, 16, and 18 of substantially equal cross section and comprising the main body portion of the switch apparatus 10. A pair of end plates 20 and 22, of disc shape and substantially the same diameter as discs 12 through 18 are provided as the top and bottom, respectively, of the entire assembly 10 for facilitating fluidic communications and mounting of contacts. It is to be understood, of course, that the discs and plates may be of configurations other than round, the particular configuration shown being desirable for one particular application and facilitating construction.

For further facilitating construction and assembly of the components, discs 12, 16, and 18 are etched printed circuit boards on the surface of which the darkened areas represent an adhering layer of conductive material and the light areas represent an absence of such layer removed as by etching. The disc 14 is a pure insulating spacer board with no conductive element adhering to it. These materials are plentiful and inexpensive and further are readily and easily processed.

The discs 14 and 16 are apertured as at 14a and 16a and deformable diaphragms such as shown at 24 are disposed between these discs. The diaphragms are made of a suitable conductive material and are somewhat larger than the apertures 14a and 16a so that in the assembled apparatus, in effect are formed pairs of chambers such as 26 and 28 separated by the diaphragm as shown in FIG. 3 of the drawing.

The overlapping portions of the diaphragm engage and make electrical contact with conductive portions such as 16b which surround the apertures and which are formed by etching away adjacent portions at 16c, of the conductive circuit board.

As described thus far, it is clear that four substantially identical switches, as shown, are incorporated in the apparatus 10. However, for purposes of brevity, simplicity, and clarity in description and explanation, only one switch is hereinafter described in detail, it being understood that the others are of substantially identical construction and are shown to illustrate that the present construction facilitates the simple, easy and practical provision of plural switches in a unitary structure.

Figure 3:
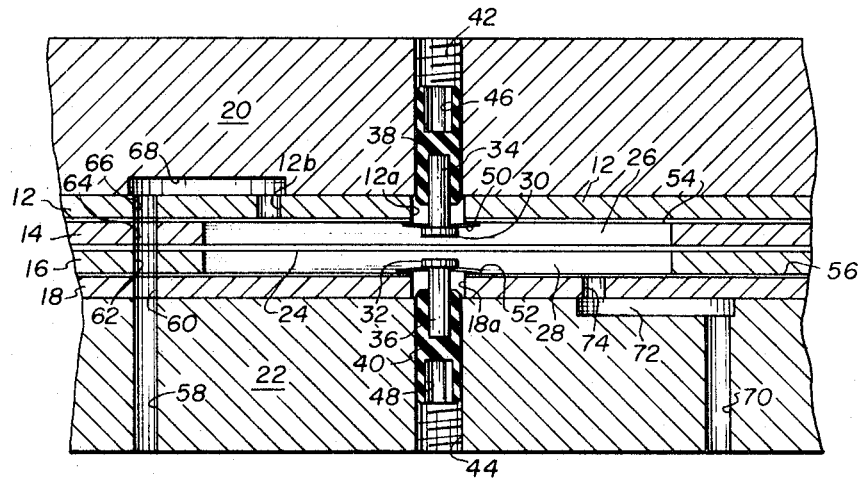
FIG. 3 is a cross-sectional view through a portion of an assembled switch according to the invention and showing the details of one switching unit.

Referring now to FIG. 3 of the drawings, as well as to FIG. 1, it is seen that each switch includes a pair of electrical contacts such as shown at 30 and 32 held in place within the chambers 26 and 28 by conductive extensions 34 and 36 passing through apertures 12a and 18a of discs 12 and 18 and secured in recesses of nonconductive studs 38 and 40, respectively. These studs are exteriorly threaded to engage the threads in bores 42 and 44 in the top and bottom end plates 20 and 22, respectively, and have hexagonal end recesses 46 and 48 to receive socket type wrenches for rotating the studs and thereby assembling or disassembling the switch or for adjusting the positions of contacts 30 and 32 relative to diaphragm 24. As shown, in the quiescent state, the contacts are spaced from the diaphragm. For preventing creep or undesired rotation of the studs and for effecting electrical connection to contacts 30 and 32, respective springs 50 and 52 are provided whereby the extensions 34 and 36 are disposed in holes in these springs and the springs engage a shoulder of an electrical contact on the one hand and conductive layers 54 and 56 on surface of the boards 12 and 18, respectively, on the other hand.

For introducing fluid to the chambers 26 and 28, appropriate channels are provided in bottom plate 22 and selected discs. To this end, a channel 58 through plate 22 is in communication with the holes 60, 62, 64, and 66 in discs 18, 16, 14, and 12, respectively, and with a groove 68 in top plate 20 to establish communication with chamber 26 through a port 12b in disc 12. A channel 70 through bottom plate 22, a groove 72, also in this plate, and a hole 74 in disc 18 establish communication between chamber 28 and the exterior of apparatus 10.

Figure 4:
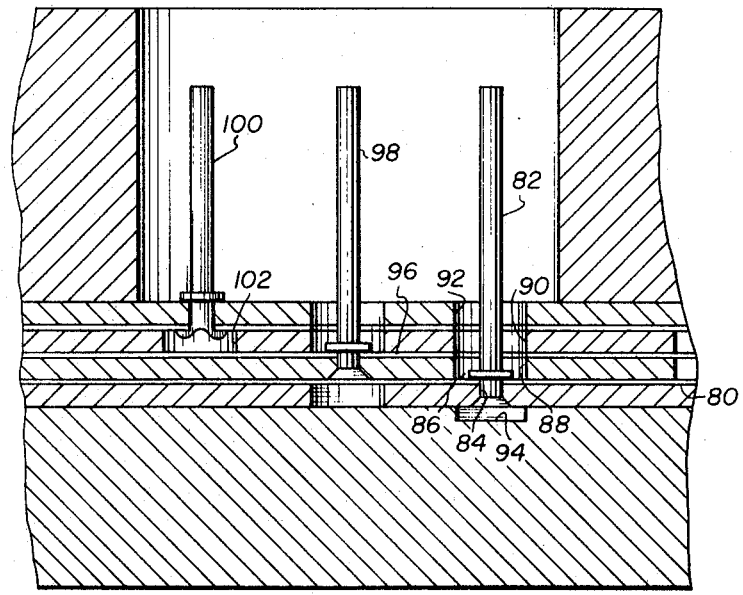
FIG. 4 is a cross-sectional view of a portion of an assembled switch according to the invention showing the details of the terminal interconnections.

As already noted hereinabove, the conductive strips 54, 56, and 16b are in the respective electrical circuits between the contacts 30 and 32 and the diaphragm 24, on the one hand, and exterior electrical terminals on the other hand. These terminals are shown more clearly in FIG. 4 as well as in FIG. 1 of the drawings. To provide external electrical connection to contact 32, as seen in these figures, the conductive layer 56 on disc 18 extends along a thin strip designated 80 to a location near the center of the disc at which the elongated conductive terminal member 82 is secured. As seen in FIG. 4, disc 18 is provided with a countersunk hole 84 and the end of terminal 82 is upset or riveted to be secured to the disc 18 and a shoulder 86 on terminal 82 is in abutment with layer 80 and preferably soldered thereto, as shown, to establish a good electrical contact. To accommodate the terminal 82, discs 16, 14, and 12 are provided with congruent holes 88, 90, and 92 through which the terminal passes. A recess 94 in bottom plate 22 accommodates any conductive protrusions from terminal 82.

For establishing external electrical connection for diaphragm 24, conductive layer 16b on disc 16 is similarly connected through layer extension 96 to terminal 98 and terminal 100 is connected to layer 54 on disc 12 to provide external electrical connection for contact 30. The end of terminal 100 is soldered to layer 54; and to accommodate the soldered connection, disc 14 is provided with an opening 102.

Each switch of the four in apparatus 10 has three terminals similar to terminals 82, 98, and 100 and appropriate holes are provided in the respective discs to accommodate these terminals.

As is clear from the foregoing description, the apparatus 10 is novel structure of a simplified, small, compact construction unaffected by age, insensitive to reasonably severe environments, and is effective for accomplishing switching in response to fluidic pressure differentials. Also, the structure inherently facilitates the provision of multiple switches in a single unit. Also the novel construction of the switch facilitates electrical switching without adding appreciable line volume to a fluidic system whereby negligible interference with the normal operation of the fluidic system occurs. In a particular application wherein the fluidic inputs to the switch are coupled to the output of a fluid amplifier, the switch is very responsive to the fluidic amplifier output and a fast rise time of the fluidic amplifier is achieved.

While the present invention has been described in a preferred embodiment, it will be obvious to those skilled in the art that various modifications can be made therein within the scope of the invention, and it is intended that the appended claims cover all such modifications.

What is claimed is:

1. An apparatus comprising a sandwiched arrangement of a first circuit board, an insulator, a flexible conductive diaphragm and second and third circuit boards, said circuit boards comprising an insulator having a conductive layer along portions thereof, said insulator and second circuit boards being apertured to form chambers on opposite sides of a portion of said diaphragm, each of said first and third circuit boards being apertured and having electrical contact means projecting through the apertures into said chambers, each of said first and third circuit boards having conductive means on one surface thereof extending from said respective contact means to a location remote from said chambers and said second circuit board having conductive means on one surface thereof extending from said diaphragm to a location remote from said chambers and fluidic channels establishing communication between each of said chambers and the exterior of said apparatus.

2. An apparatus comprising a juxtaposed arrangement of a first circuit board, an insulating spacer, a conductive resilient diaphragm, and second and third circuit boards, said insulating spacer and second circuit board having a plurality of pairs of apertures, the apertures of each pair overlapping in projection to form pairs of chambers on opposite sides of said diaphragm, said first and third circuit boards having respective electrical contacts projecting therethrough into each of said chambers, a plurality of sets of electrical terminals, said plurality of sets being equal to the plurality of said pairs of chambers, each of said circuit boards having a thin conductor adhering to one surface thereof and interconnecting three terminals of each set respectively to the diaphragm and the pair of contacts of each pair of apertures, and means establishing fluidic communication between each chamber and an exterior entity.

References Cited

UNITED STATES PATENTS

| | | | |
|---|---|---|---|
| 2,421,149 | 5/1947 | Hard af Segerstad | 200—83.8 XR |
| 3,009,032 | 11/1961 | Friend et al. | 200—83.8 |
| 3,233,059 | 2/1966 | Pridham et al. | 200—46 XR |
| 3,256,399 | 6/1966 | Palmer | 200—83.8 |
| 3,268,683 | 8/1966 | Palmer | 200—46 XR |

ROBERT K. SCHAEFER, Primary Examiner

J. R. SCOTT, Assistant Examiner